W. A. FRAZER.
PIVOTED STEERING WHEEL FOR AUTOMOBILES.
APPLICATION FILED AUG. 14, 1915.
1,172,696.
Patented Feb. 22, 1916.
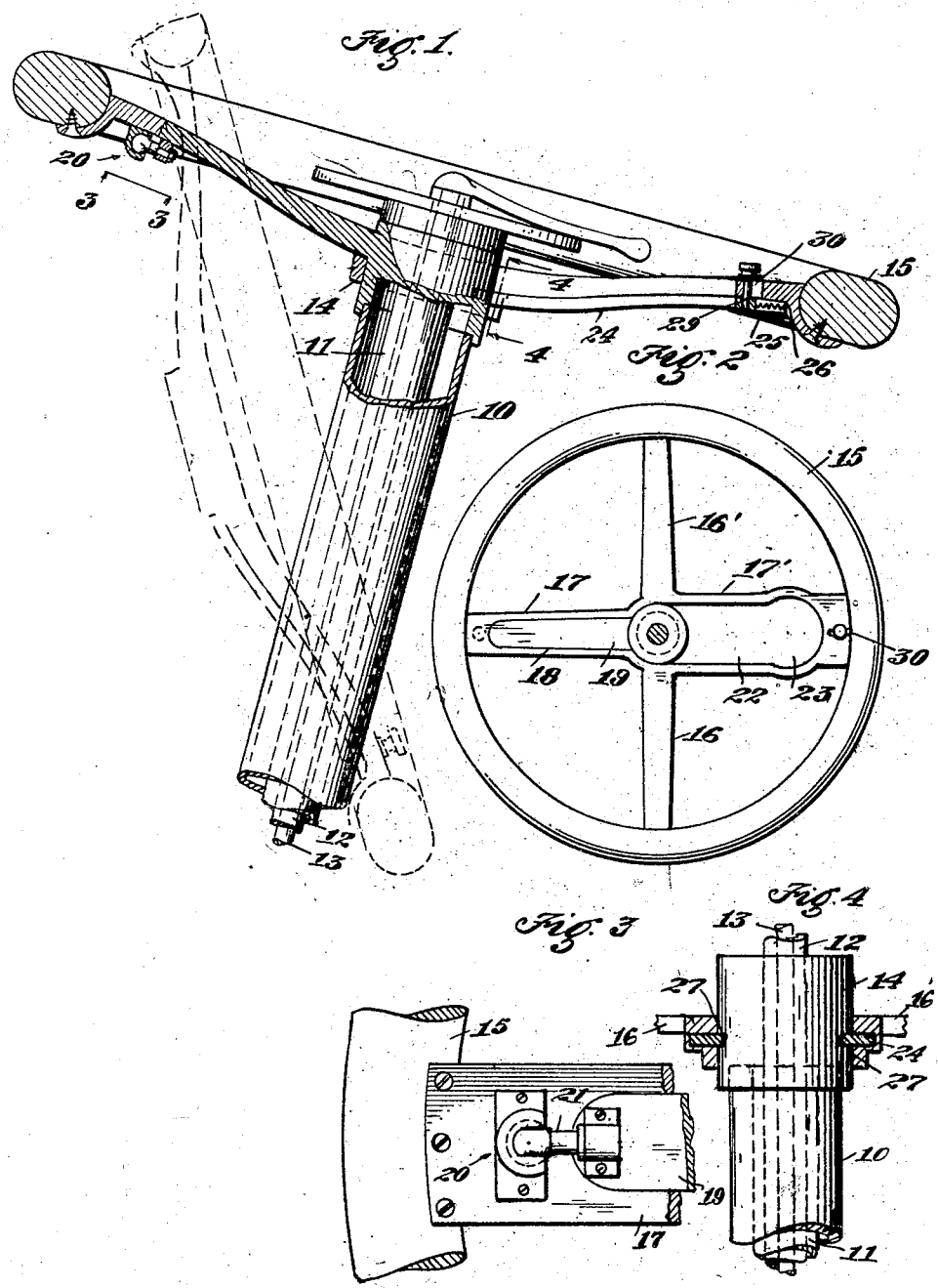

UNITED STATES PATENT OFFICE.

WILLIAM A. FRAZER, OF LOS ANGELES, CALIFORNIA.

PIVOTED STEERING-WHEEL FOR AUTOMOBILES.

1,172,696.  Specification of Letters Patent.  Patented Feb. 22, 1916.

Application filed August 14, 1915. Serial No. 45,561.

*To all whom it may concern:*

Be it known that I, WILLIAM A. FRAZER, a citizen of the United States, residing at Los Angeles, in the county of Los Angeles and State of California, have invented new and useful Improvements in Pivoted Steering-Wheels for Automobiles, of which the following is a specification.

My invention relates to a pivoted steering wheel for automobiles.

As well known the steering wheel is usually in the way of the driver when he enters the car to take his seat, and consequently the driver's compartment is usually entered at the side away from the steering wheel.

It is an object of this invention to provide a steering wheel, which may be instantly unlocked from its engagement with the steering shaft and turned out of the way of the driver, and which may be instantly moved back into its normal operative position and locked into place.

Another object of this invention is to provide a steering wheel having a universal joint connection with the steering shaft whereby the wheel may be turned on the universal pivot and moved out of the way of the driver irrespective of the position of the front axle of the automobile.

With these and other objects in view, which will appear as the description proceeds, my invention consists in the construction and arrangement of parts hereinafter described and claimed.

In the following drawings which form a part of this specification, I have shown a convenient and practical embodiment of my invention, and in which, Figure 1, is a vertical section through the steering wheel shown as applied to a steering gear having a hollow steering shaft and inner concentric connections for operating the throttle valve and the spark adjuster, respectively. Fig. 2, is a top plan view thereof, with the throttle valve lever and spark adjuster levers removed. Fig. 3, is an enlarged detail view of the universal joint connecting the steering wheel to the steering shaft looking up from the bottom of the steering wheel along the line 3—3, Fig. 1. Fig. 4, is an enlarged detail view of the latch mechanism of the steering wheel engaging the collar of the steering shaft, taken on line 4—4, Fig. 1.

Referring to Figs. 1 to 4 concentrically located in a tubular steering post 10, is a hollow steering shaft 11, in which a hollow shaft 12, containing a rod 13, is located. Secured to the upper end of the steering shaft is a collar 14, provided with a circular downwardly extending flange having an internal annular shoulder engaging the upper end of the tubular steering post. Hollow shaft 12, and rod 13 pass centrally through the steering shaft collar and are provided at their upper ends with suitable levers for operating the throttle valve of the carbureter and the spark adjuster respectively.

The steering wheel is secured to the steering shaft collar as follows: From the circular rim 15 four radial spider arms 16, 16′, 17 and 17′ extend toward the center and are disposed at right angles to each other. The arms 16, 16′ are solid except at the center where they are joined to the arms 17 and 17′. At this place the inner ends of arm 16, 16′ form segmental sections of a collar adapted to engage the steering shaft collar 14. The arm 17 is provided with a longitudinal slot 18 extending from collar 14 to a point near the upper end of said arm.

19 is a connecting member formed integral with collar 14 and made of a size and shape to fit the longitudinal slot 18, so that its upper and lower faces are flush with the upper and lower faces of the arm 17. A ball and socket joint 20 secured to the lower face of arm 17 adjacent to the outer end of connecting member 19 is connected by a pin 21 secured to the lower face of the end of connecting member 19. The arm 17′ is enlarged and provided with a wider slot 22, which is still further enlarged at the lower end thereof as at 23. A substantially U-shaped latch member 24 of a size and shape to fit the marginal sides of arm 17′ engage the under side thereof. The outer end of latch member is slidably mounted in a slotted recess 25 provided at the lower face at the outer end of arm 17. A spring member 26 mounted in said recess tends to force the latch member into a pair of slots 27 provided at diametrically opposed points in collar 14, such slots being approximately at the middle point of the inner ends of arm 16 and 16′. A pin 29 provided with a vertical button at its upper end, and secured to the lower end of the latch member, extends upwardly through a slot 30 in the lower end of arm 17′.

From the foregoing description the operation of the pivoted steering wheel will be easily understood. When it is desired to move the steering wheel out of the way of the driver button 29 is pushed toward the adjacent rim 15 against the tension of spring member 26 whereby the latch member 24 is withdrawn from its locking engagement with slots 27 on collar 14. The steering wheel will tilt downwardly swinging on its pivot 20. When it is desired to tilt the wheel laterally, in the case that the front axle is turned in one direction or the other, the steering wheel may be tilted one-quarter turn swinging on its universal pivot joint 20. When the wheel is to be locked into operative position it is merely necessary to raise the same by operating button 29 and to allow the latch member to engage the slots 27. The object of enlarging the lower end of slot 22 is to allow this lateral tilting movement about the tubular steering post.

It will be understood that the construction of the steering gear is immaterial and that my invention is applicable to steering gears of any construction whether the levers operating the throttle valve and spark adjuster are located above or below the steering wheel.

It will be obvious to those skilled in the art that various changes in the construction of the device may be made without departing from the spirit of this invention as covered in the appended claims.

My improved steering wheel is especially valuable when used in connection with the automobile steering column covered by my Patent No. 1,145,761 of July 6, 1915.

I claim:—

1. The combination of a steering shaft of an automobile, a steering wheel removably mounted thereon, said steering wheel having four radial spider arms meeting at the center and forming a segmental hub at the center engaging said shaft, the arm away from the driver being provided with a longitudinal slot extending from said shaft, a wheel supporting member secured to said shaft and adapted to fit snugly in said slot, a universal joint at the lower side of said slotted arm connecting said supporting member and said slotted arm, the arm in longitudinal alinement with said first named arm having a longitudinal slot, and a manually controlled, spring-pressed latch disposed along the lower face of said last mentioned arm for locking said wheel to said steering shaft.

2. The combination of a steering shaft of an automobile, a steering wheel removably mounted thereon and having a plurality of radial arms meeting at the center and engaging said shaft, one of said arms having a longitudinal slot extending from said shaft, a wheel supporting member integral with said shaft adapted to fit snugly in said slot, a universal joint connecting said supporting member and said slotted arm, the arm in longitudinal alinement with said first named arm having a longitudinal slot adapted to permit the wheel to be lowered about said shaft, and a manually controlled latch locking said wheel to said steering shaft.

3. The combination of a steering shaft of an automobile, a steering wheel removably mounted thereon, said steering wheel having a plurality of spider arms meeting at the center and engaging said shaft, one of said arms being provided with a longitudinal slot, a wheel supporting connection secured to said shaft and adapted to register with said slot, a universal pivot connecting said supporting member to said slotted arm, and a manually controlled latch for locking said wheel to said steering shaft.

4. The combination of a steering shaft of an automobile, a steering wheel removably mounted thereon and having a plurality of radial arms, a rigid wheel supporting member secured to said steering shaft, a universal joint connecting the outer end of said supporting member to one of said radial arms, said universal joint allowing the wheel to be tilted in any direction when the latter is removed from the steering shaft, and manually operated means for locking said wheel to said shaft.

5. The combination of a steering shaft of an automobile, a steering wheel removably mounted thereon and having a plurality of radial arms, a rigid wheel supporting member secured to said steering post, a pivot having universal movement connecting said member to one of said arms, said pivot allowing the wheel to be tilted in any direction when the latter is removed from the steering shaft, and manually operated means for locking said wheel to said shaft.

In testimony whereof I have signed my name to this specification.

WILLIAM A. FRAZER.